(12) United States Patent
Conway

(10) Patent No.: US 9,739,326 B2
(45) Date of Patent: Aug. 22, 2017

(54) ROTOR BRAKE WITH INTEGRATED IMPELLER

(71) Applicant: Bell Helicopter Textron Inc., Fort Worth, TX (US)

(72) Inventor: Gary S. Conway, Pantego, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 471 days.

(21) Appl. No.: 14/059,997

(22) Filed: Oct. 22, 2013

(65) Prior Publication Data

US 2015/0110622 A1    Apr. 23, 2015

(51) Int. Cl.
*F16D 65/847*    (2006.01)
*F16D 65/12*    (2006.01)
*B64C 27/12*    (2006.01)

(52) U.S. Cl.
CPC .......... *F16D 65/847* (2013.01); *B64C 27/12* (2013.01); *F16D 65/128* (2013.01)

(58) Field of Classification Search
CPC ...... F16D 65/847; F16D 65/128; B64C 27/12
See application file for complete search history.

(56) References Cited

U.S. PATENT DOCUMENTS

| 3,228,195 | A | * | 1/1966 | Brent | B64C 27/12 60/578 |
|---|---|---|---|---|---|
| 3,563,497 | A | * | 2/1971 | Holmes | B64C 27/02 244/12.3 |
| 3,791,498 | A | | 2/1974 | Wassermann | |
| 4,782,922 | A | * | 11/1988 | Pearson | F16D 55/32 188/367 |
| 5,651,430 | A | | 7/1997 | Rancourt et al. | |
| 6,193,464 | B1 | * | 2/2001 | Nyhus | B60T 1/065 416/169 R |
| 7,168,533 | B2 | | 1/2007 | Podratzky | |
| 7,554,237 | B2 | | 6/2009 | Clary | |
| 2005/0058536 | A1 | | 3/2005 | Podratzky | |

FOREIGN PATENT DOCUMENTS

| CA | 2769431 | 1/2012 |
|---|---|---|
| DE | 102006028671 A1 | 12/2007 |
| EP | 0894712 A2 | 2/1999 |
| EP | 1650431 A2 | 4/2006 |
| FR | 2982923 A1 | 5/2013 |

OTHER PUBLICATIONS https://www.s2ki.com/forums/s2000-racing-competition-11/front-rear-brake-ducting-apr-brake-shields-1091140/ (S2KI).*

(Continued)

*Primary Examiner* — Craig Kim
*Assistant Examiner* — Juan G Flores
(74) *Attorney, Agent, or Firm* — Lightfoot & Alford PLLC

(57) ABSTRACT

According to one embodiment, a rotor brake includes a first braking surface having an opening therethrough, a second braking surface adjacent to the first braking surface, and an impeller disposed between the first and second braking surfaces such that rotation of the impeller pulls fluid through the opening of the first braking surface and expels the fluid out through a gap between the first and second braking surfaces.

20 Claims, 3 Drawing Sheets

(56) References Cited

OTHER PUBLICATIONS https://sites.google.com/site/elwoodsturbofb/Home/big-brake-package (Elwoods).*
Office Action in Related U.S. Appl. No. 14/060,016, dated Feb. 27, 2015, 57 pages.
Office Action in Related Canadian Application No. 2,867,905, dated Jan. 8, 2016, 4 pages.
Examination Report in related European Application No. 14150509.9, dated Jun. 5, 2014, 5 pages.
Examination Report in related European Application No. 14150510.7, dated Jun. 13, 2014, 6 pages.
European Search Report in related European Application No. 14150509.9, dated May 22, 2014, 3 pages.
European Search Report in related European Application No. 14150510.7, dated May 26, 2014, 3 pages.
Communication Under Rule 71(3) EPC in related European Application No. 14150509.9, dated May 28, 2015, 23 pages.
Communication Under Rule 71(3) EPC in related European Application No. 14150510.7, dated May 28, 2015, 24 pages.
Notice of Allowance in related U.S. Appl. No. 14/060,016, dated Feb. 23, 2016, 8 pages.
Office Action in related Canadian Patent Application Serial No. 2,867,905, dated Dec. 7, 2016, 4 pages.

* cited by examiner

ROTOR BRAKE WITH INTEGRATED IMPELLER

TECHNICAL FIELD

This invention relates generally to rotorcraft brakes, and more particularly, to a rotor break with integrated impeller.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to improve rotorcraft braking performance. A technical advantage of one embodiment may also include the capability to improve cool the braking disk of a rotorcraft braking system. A technical advantage of one embodiment may also include the capability to improve rotorcraft braking performance by replacing the solid braking disk with a braking disk having a built-in impellor for cooling the braking disk. A technical advantage of one embodiment may also include the capability to improve rotorcraft braking performance by providing a rotor brake control system that manages rotor brake operation as a function of temperature.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
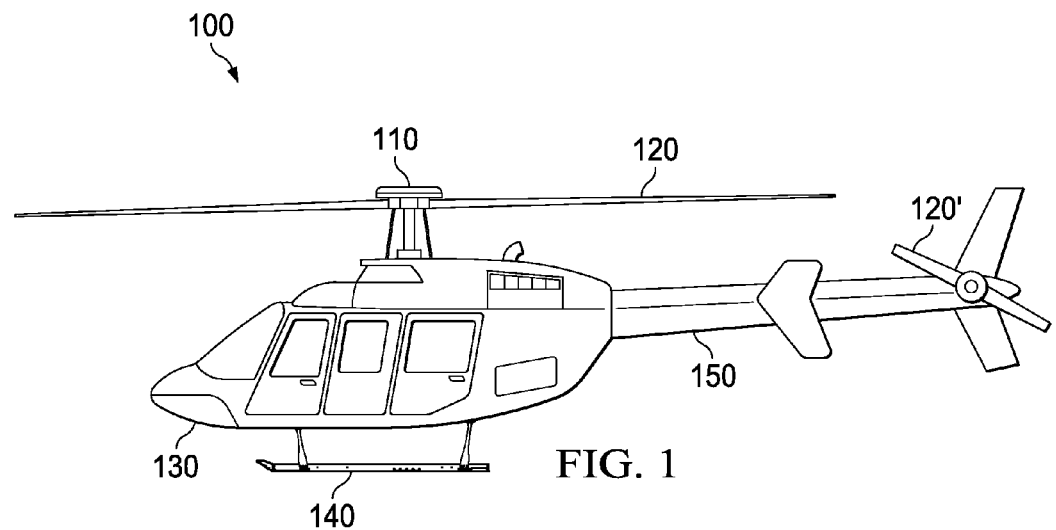
FIG. 1 shows a rotorcraft according to one example embodiment.

FIG. 1A shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

During operation of rotorcraft 100, rotor system 110 may rotate blades 120, the drive shaft, and other components at a very high speed. As one example, a particular rotorcraft 100 may operate rotor system 110 at 8100 revolutions per minute.

In some scenarios, the operator of rotorcraft 100 may wish to slow the rotation of blades 120. For example, the operator may wish to slow/stop the rotation of blades 120 after landing rotorcraft 100. Accordingly, some rotorcraft may be equipped with a rotor braking system. An example rotor braking system may include a solid braking disk in mechanical communication with rotor system 110 and a combination of calipers and brake pads operable to slow rotation of the solid braking disk, thereby slowing rotation of rotor system 110.

In this example rotor braking system, the solid braking disk slows rotation of rotor system 110 by converting angular momentum into heat. Overheating the solid breaking disk, however, may cause a variety of problems, such as permanent warping of the disk, vibrations, and shearing of disk mounting bolts. In addition, a warped brake disk must be replaced, adding considerable expense and delays to normal rotorcraft operation.

Although the solid breaking disk may release some heat into the surrounding environment, the solid braking disk may not be able to release heat quickly enough for efficient braking. For example, a rotorcraft 100 equipped with a 9.5 inch diameter solid braking disk may be limited to only applying the rotor brake once per hour and/or may be limited to only applying the rotor brake once the rotation speed of blades 120 has slowed to forty percent of normal operating speed. Of course, increasing the size of the solid braking disk may improve thermal release during operation but may also cause other design issues within a rotorcraft 100.

Accordingly, teachings of certain embodiments recognize the capability to improve rotorcraft braking performance by cooling the braking disk. For example, as will be explained in greater detail below, teachings of certain embodiments recognize the capability to improve rotorcraft braking performance by replacing the solid braking disk with a braking disk having a built-in impellor for cooling the braking disk. In addition, as will be explained in greater detail below, teachings of certain embodiments recognize the capability to improve rotorcraft braking performance by providing a rotor brake control system that manages rotor brake operation as a function of temperature.

Figure 2:
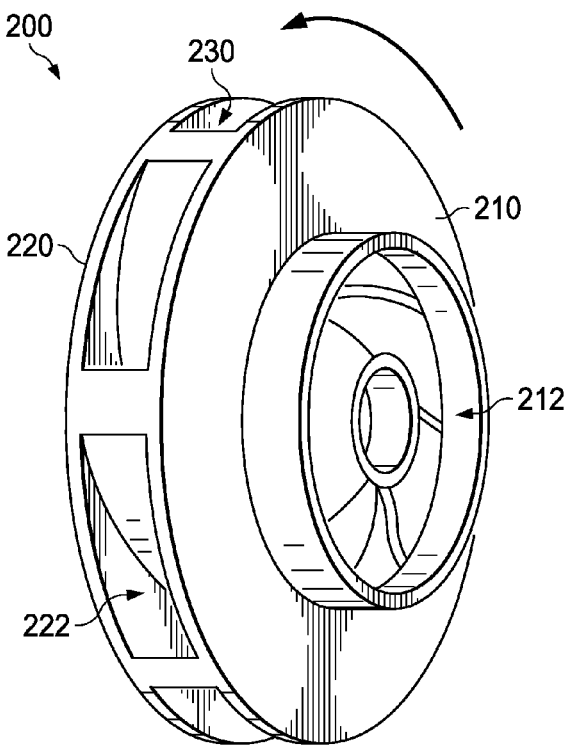
FIG. 2 shows a rotor brake according to one example embodiment that may be installed on aircraft such as the rotorcraft of FIG. 1.

FIG. 2 shows a rotor brake 200 according to one example embodiment. In the example of FIG. 2, rotor brake 200 features braking surfaces 210 and 220 and an impellor 230.

As seen in the example of FIG. 2, braking surface 210 has an opening 212 therethrough. In operation, according to some embodiments, opening 212 may operate as an inlet, allowing air to enter into impellor 230.

Braking surface 220 is adjacent to braking surface 210 and is separated from braking surface 210 by gaps 222. Impellor 230 is disposed between and fixably coupled to braking surfaces 210 and 220. In operation, according to some embodiments, rotation of rotor brake 200 causes braking surface 210, braking surface 220, and impellor 230 to rotate. Rotation of impellor 230 causes impellor 230 to pull fluid through opening 212 (the inlet) and expel the fluid through gaps 222 (the outlets).

In this example, braking surface 210, braking surface 220, and impellor 230 may, in combination, represent a centrifugal pump. A centrifugal pump is a device that transports fluids by the conversion of rotational kinetic energy to the hydrodynamic energy of the fluid flow. In the example of FIG. 2, impellor 230 may represent a closed concept, end suction, impellor. For example, impellor 230 may represent a closed concept impellor because it is bounded by braking surfaces 210 and 220. In addition, impellor 230 may represent an end suction impellor because of how it pulls fluid through opening 212. In the example of FIG. 2, the axis of rotation of impellor 230 passes through opening 212, which may allow impellor 230 to receive fluid through the center of the impellor and expel the fluid out the outer circumference of the impellor.

Figure 3:
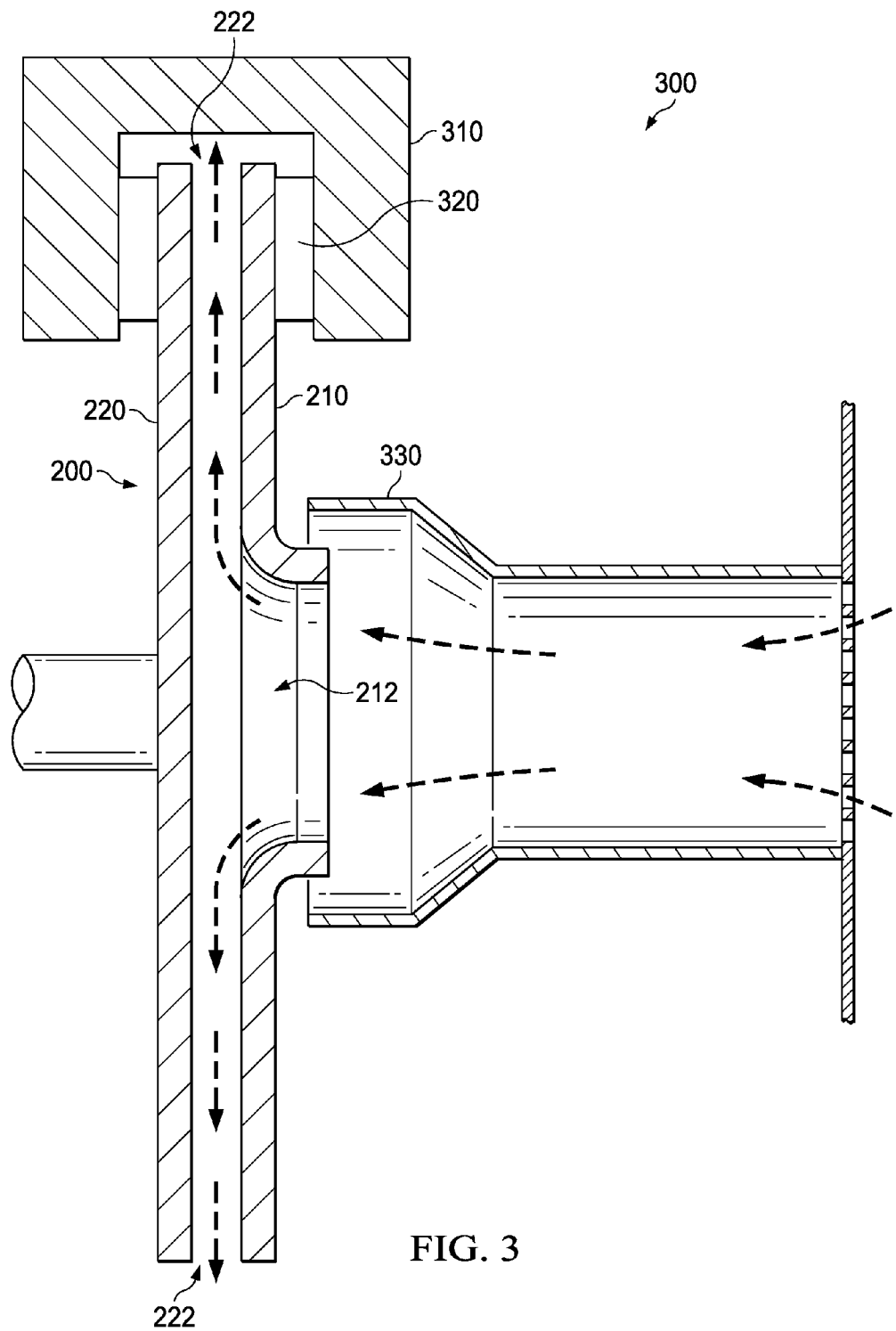
FIG. 3 shows a rotor brake system according to one example embodiment that incorporates the rotor brake of FIG. 2.

FIG. 3 shows a rotor brake system 300 according to one example embodiment. In the example of FIG. 3, rotor brake system 300 features the rotor brake 200 of FIG. 2, calipers 310, brake pads 320, and ducts 330. The impellor 230 of rotor brake 200 has been removed from FIG. 3 for clarity purposes.

In operation, according to one example embodiment, rotor brake system 300 may slow rotation of rotor brake 200 by the friction caused by pushing brake pads 320 against braking surfaces 210 and 220 using calipers 320. In this example, rotor brake 200 is in mechanical communication with the drive shaft of rotor system 110 such that rotor brake 200 and the drive shaft rotate at approximately the same speed. Accordingly, slowing rotation of rotor brake 200 also slows rotation of the drive shaft, which then slows rotation of blades 120.

The friction caused by pushing brake pads 320 against braking surfaces 210 and 220 may also generate heat in braking surfaces 210 and 220. As rotor brake 200 rotates, however, impellor 230 draws fluid from ducts 330, through opening 212, and out gaps 222. Accordingly, teachings of certain embodiments recognize that impellor 230 may cool rotor brake 200 by pumping fluid past braking surfaces 210 and 220, thus allowing braking surfaces 210 and 220 to transfer heat to the flow of fluid. Teachings of certain embodiments recognize that providing impellor 230 may allow rotor brake 200 to cool much more quickly than a solid rotor disk.

The fluid pumped through rotor brake 200 may also be used to cool other components within rotorcraft 100. For example, the fluid pumped through rotor brake 200 may also cool components near rotor brake 200, such as the transmission and generator.

Teachings of certain embodiments recognize that a variety of fluids may be used to cool rotor brake 200 and/or surrounding components. In one example embodiment, the fluid is air. Teachings of certain embodiments recognize that air may remove large amounts of heat from rotor brake 200 when rotor brake 200 is rotating at higher speeds. In some embodiments, ducts 330 may improve cooling efficiency by providing air from outside rotorcraft 100. Teachings of certain embodiments recognize that outside air may be significantly cooler than air found within the rotorcraft body, where air temperatures can be in excess of 250 degrees Fahrenheit.

Embodiments of rotor brake 200 and rotor brake system 300 may include more, fewer, or different components. As one example, rotor brake system 300 may include multiple rotor brakes 200. For example, rotor brake system 300 may include two rotor brakes 200 rotating in opposite directions.

As explained above, a rotor brake may generate a considerable amount of heat, and excess heat may limit rotor brake performance or cause rotor brake failure. Teachings of certain embodiments recognize that devices such as rotor brake 200 may improve rotor brake performance by removing heat from the rotor brake. In addition, as will be explained below, teachings of certain embodiments recognize the capability to improve rotor brake performance by controlling operation of a rotor brake as a function of temperature.

Figure 4:
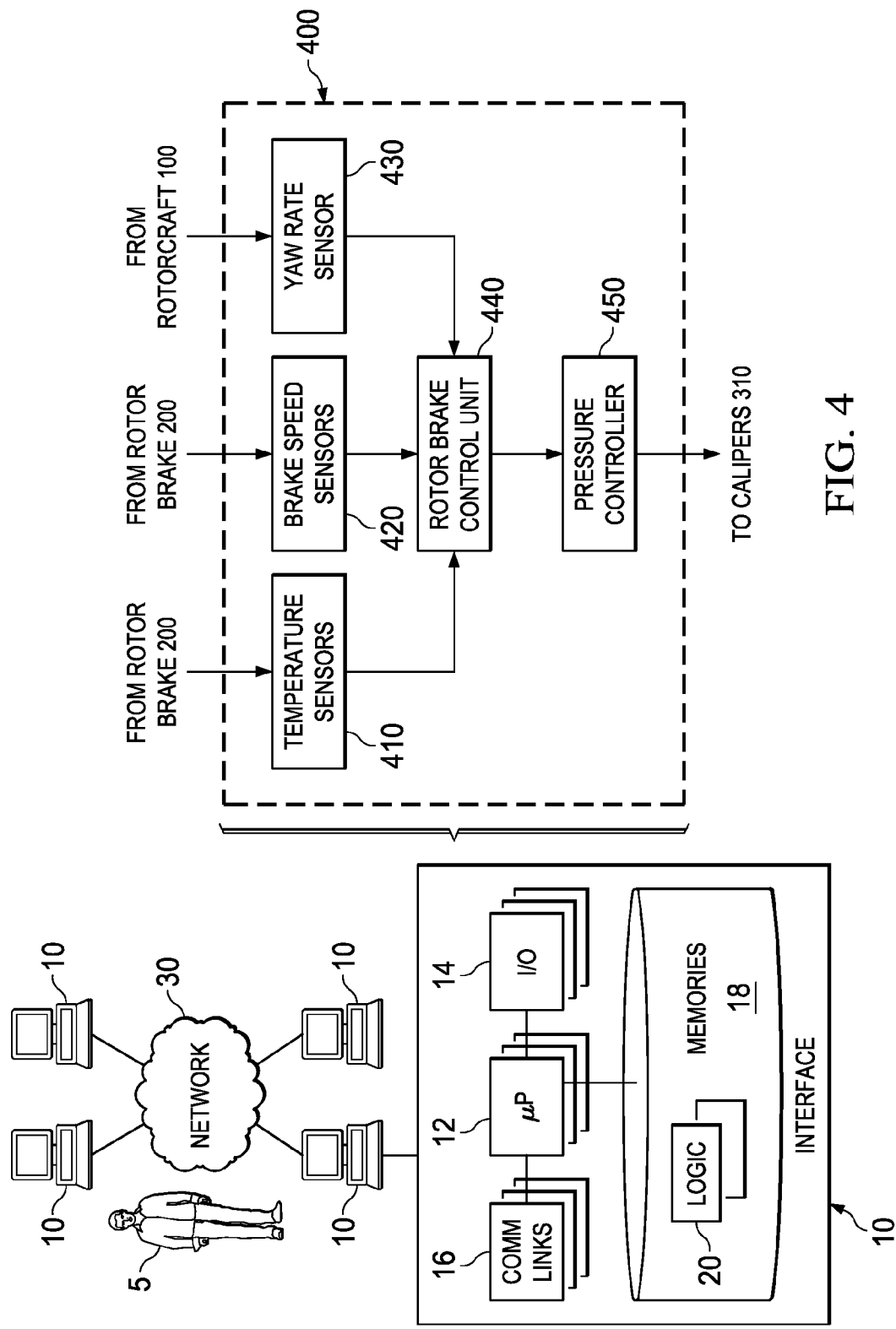
FIG. 4 shows a rotor brake control system according to one example embodiment that may work in cooperation with the rotor brake system of FIG. 3.

FIG. 4 shows a rotor brake control system 400 according to one example embodiment. In the example of FIG. 4, system 400 features temperature sensors 410, a yaw rate sensor 430, a rotor brake control unit 440, and a pressure controller 450, that may be implemented at least partially by one or more computer systems 10. All, some, or none of the components of system 400 may be located on or near rotorcraft 100 (or another aircraft).

Users 5 may access system 400 through computer systems 10. For example, in some embodiments, users 5 may access rotor brake control unit 440, which may be at least partially associated with a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Temperature sensors 410 may measure (or receive measurements representative of) an operating temperature of a rotor brake (such as rotor brake 200). The operating temperature of a rotor brake may represent any temperature associated with the operation of the rotor brake, such as surface temperature of the rotor brake measured during operation of the rotor brake. In one example embodiment, temperature sensors 410 may represent infrared temperature sensors configured to measure the surface temperature of a rotor brake. In some embodiments, rotor brake system 300 may include multiple rotor brakes 200, and rotor brake control system 400 may include temperature sensors 410 associated with each rotor brake 200.

Yaw rate sensor 430 may detect and/or measure yaw movement of an aircraft (such as rotorcraft 100). An aircraft such as rotorcraft 100 may be subject to yaw movement, for example, if applying pressure to a rotor brake while the aircraft is parked on a slippery surface.

Rotor brake control unit 440 may receive measurements from temperature sensors 410 and yaw rate sensor 430, and send instructions to pressure controller 450 based on the received measurements. Pressure controller 450 may instruct calipers 310 on how to applying braking pressure against rotor brake 200 using brake pads 320. For example, pressure controller 450 may instruct calipers 310 to increase or decrease braking pressure, which may result in a change in friction and heat generation.

In one example embodiment, rotor brake control unit 440 instructs pressure controller 450 to change the amount of friction generated between brake pads 320 and rotor brake 200 based on the operating temperature measured by temperature sensors 410. For example, rotor brake control unit 440 may instruct pressure controller 450 to reduce the amount of friction generated between brake pads 320 and rotor brake 200 if the measured operating temperature exceeds a threshold value. This threshold value may represent, for example, a maximum operating temperature of rotor brake 200. In another example, rotor brake control unit 440 may instruct pressure controller 450 to increase or decrease the amount of friction generated between brake pads 320 and rotor brake 200 such that the measured operating temperature moves towards a preferred value (e.g., 800 degrees Fahrenheit). Thus, in this example, rotor brake control unit 440 may allow rotor brake system 300 to achieve efficient rotor braking by reducing braking force if the measured operating temperature of rotor brake 200 exceeds a preferred value or increasing braking force if the measured operating temperature of rotor brake 200 is less than the preferred value.

In yet another example embodiment, rotor brake control unit 440 instructs pressure controller 450 to change the amount of friction generated between brake pads 320 and rotor brake 200 if yaw movement is detected by yaw rate sensor 430. For example, rotor brake control unit 440 may instruct pressure controller 450 to reduce the amount of friction generated between brake pads 320 and rotor brake 200 if the measured yaw movement exceeds a threshold value. In some embodiments, this threshold value may be set at zero or a value near zero. Teachings of certain embodiments recognize that adjusting braking force based on detection of yaw movement may allow rotor brake control system 400 to prevent a yaw event before the pilot is able to sense and react to yaw.

Accordingly, teachings of certain embodiments recognize that factors such as temperature, rotation speed, and yaw movement may affect braking performance. Therefore, as explained above, embodiments of rotor brake control system 400 may measure these and other performance factors and increase or decrease rotor braking force based on these measurements. Thus, for example, rotor brake control system 400 may decrease braking force in response to detected yaw movement even if the measured temperatures and rotor brake speeds are within acceptable operating ranges.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a main rotor system coupled to the power train, the main rotor system comprising at least one main rotor blade;
   a rotor brake system coupled to the power train, the rotor brake system comprising at least one caliper, at least one brake pad, a duct, and a rotor brake in mechanical communication with the drive shaft, the rotor brake comprising:
      a first braking surface having an opening therethrough;
      a second braking surface adjacent to the first braking surface; and
      an impeller disposed between the first and second braking surfaces such that rotation of the impeller pulls fluid through the opening of the first braking surface and expels the fluid out through a gap between the first and second braking surfaces;
      wherein at least a portion of the rotor brake is disposed within the duct; and
      wherein an end of the duct that is disposed nearest the first braking surface is offset from the first braking surface along an axis of rotation of the impeller.

2. The rotorcraft of claim 1, wherein the first braking surface, the second braking surface, and the impeller, in combination, form a centrifugal pump.

3. The rotorcraft of claim 1, wherein the impeller is fixably coupled to the first and second braking surfaces.

4. The rotorcraft of claim 1, wherein the fluid is air.

5. The rotorcraft of claim 1, wherein the axis of rotation of the impeller passes through the opening of the first braking surface.

6. The rotorcraft of claim 1, wherein the rotor brake is in mechanical communication with the drive shaft such that the rotor brake and the drive shaft rotate at approximately the same speed.

7. The rotorcraft of claim 1, wherein the rotor brake is in mechanical communication with the drive shaft such slowing rotation of the rotor brake also slows rotation of the drive shaft.

8. A rotor brake system, comprising:
   a duct; and
   a rotor brake, comprising:
      a first braking surface having an opening therethrough;
      a second braking surface adjacent to the first braking surface; and
      an impeller disposed between the first and second braking surfaces such that rotation of the impeller pulls fluid through the opening of the first braking surface and expels the fluid out through a gap between the first and second braking surfaces;
   wherein at least a portion of the rotor brake is disposed within the duct; and
   wherein an end of the duct that is disposed nearest the first braking surface is offset from the first braking surface along an axis of rotation of the impeller.

9. The rotor brake of claim 8, wherein the first braking surface, the second braking surface, and the impeller, in combination, form a centrifugal pump.

10. The rotor brake of claim 8, wherein the impeller is fixably coupled to the first and second braking surfaces.

11. The rotor brake of claim 8, wherein the fluid is air.

12. The rotor brake of claim 8, wherein the axis of rotation of the impeller passes through the opening of the first braking surface.

13. A method of cooling a rotor brake in a rotorcraft, the method comprising:
   applying a friction force against the rotor brake;
   disposing at least a portion of the rotor brake within a duct and moving a fluid through the duct to the rotor brake;
   pumping the fluid through a portion of the rotor brake that is not disposed within the duct; and
   removing heat from the rotor brake through the fluid.

14. The method of claim 13, wherein applying the friction force against the rotor brake comprises applying a first friction force against a first braking surface of the rotor brake and applying a second friction force against a second braking surface of the rotor brake.

15. The method of claim 14, wherein pumping the fluid through the rotor brake comprises pumping the fluid between the first and second braking surfaces.

16. The method of claim 15, wherein pumping the fluid between the first and second braking surfaces comprises pumping the fluid through an opening of the first braking surface and out through a gap between the first and second braking surfaces.

17. The method of claim 13, wherein pumping the fluid through the rotor brake comprises providing a centrifugal pump in the rotor brake configured to pump fluid through the rotor brake.

18. The method of claim 17, wherein the centrifugal pump comprises an impellor.

19. The method of claim 13, wherein applying the friction force against the rotor brake slows rotation of the rotor brake.

20. The method of claim 19, the rotorcraft comprising a power source, a drive shaft coupled to the power source, a main rotor system in mechanical communication with the drive shaft, and the rotor brake in mechanical communication with the drive shaft, wherein slowing rotation of the rotor brake slows rotation of at least one rotor blade of the main rotor system.

\* \* \* \* \*